United States Patent [19]

Orain

[11] 4,439,168

[45] Mar. 27, 1984

[54] COUPLING BETWEEN TWO ROTARY SHAFTS

[75] Inventor: Michel Orain, Conflans Ste Honorine, France

[73] Assignee: Glaenzer Spicer, Poissy, France

[21] Appl. No.: 247,504

[22] Filed: Mar. 25, 1981

[30] Foreign Application Priority Data

Mar. 31, 1980 [FR] France .................. 80 07156

[51] Int. Cl.³ .............. B61C 9/00; F16D 3/30
[52] U.S. Cl. .................. 464/69; 464/137; 464/905
[58] Field of Search ............ 464/69, 121, 137, 138, 464/147, 905

[56] References Cited

U.S. PATENT DOCUMENTS

| | | | |
|---|---|---|---|
| 2,292,675 | 8/1942 | Thiry | 464/69 X |
| 2,481,640 | 9/1949 | Amberg | 464/121 |
| 4,084,411 | 4/1978 | Mayfield | 464/69 |

FOREIGN PATENT DOCUMENTS

| | | | |
|---|---|---|---|
| 14966 | of 1912 | United Kingdom | 464/137 |
| 211232 | 2/1968 | U.S.S.R. | 464/137 |

*Primary Examiner*—Stuart S. Levy
*Assistant Examiner*—Daniel P. Stodola
*Attorney, Agent, or Firm*—Wenderoth, Lind & Ponack

[57] ABSTRACT

The coupling comprises a plate rigid with each shaft and a floating intermediate device connected to each of the two plates. The floating device comprises at least three levers which are assembled by a center articulation. Each of the levers is connected by a radially slidable ball joint at one end to one of the plates, and at the other end to the other plate. At least one of the ball joints of each lever is axially fixed.

7 Claims, 26 Drawing Figures

COUPLING BETWEEN TWO ROTARY SHAFTS

DESCRIPTION

The present invention relates to a coupling between two rotary shafts of the type comprising a plate rigid with each shaft and a floating intermediate device connected to each of the two plates and formed by at least three levers which are assembled by a centre articulation each lever being connected by a radially slidable ball joint, at one end, to one of the plates and at the other end, to the other plate.

When it concerns coupling two transmission shafts which have a variable offset therebetween, there is usually employed an intermediate shaft provided at each end with a universal joint (Cardan joint, tripod joint or joint having balls) which operates at an angle which which is the greater as the offset between the two shafts to be coupled is great and said intermediate shaft is short.

Now, in some applications (for example in railway vehicles), the axially available space is small and the intermediate shaft is so short that it results in exaggerated and unacceptable operating angles for universal joints which must rotate at high speed. In some applications, the axially available space is even so restricted that it is impossible to dispose therein two joints and an intermdiate shaft however short the latter may be.

In such situations, couplings based on an elastomer have been proposed, but two major drawbacks limit the use of such couplings:

on one hand, the elastomers which are subjected to rapid tangential deformations are the centre of an exaggerated overheating due to the effect of hysteresis so that they lose their elastic qualities, and fatigue and cutting phenomena rapidly put them out of service;

on the other hand, the applications with high torque (3,000 m.kg) and high speeds (3,000 to 4,000 rpm), such as railway applications, result in couplings of large diameter (300 to 500 mm) in which the blocks of elastomer are subjected to centrifugal accelerations of the order of 15,000 m/s$^2$. This implies that these elastomers be either relatively hard or employed in thin layers, but a direct consequence of this is that their articulation function is considerably lessened and the coupling can only support small departures from alignment of the two shafts.

Thus the use of elastomers is limited to arrangement which transmit low power and allow only a small radial offset between the shafts.

There have also been proposed (see U.S. Pat. No. 2,481,640) couplings of the type mentioned at the start of the present description. However, in this known coupling, all the ball joints are axially slidable. Consequently, this coupling does not remain homokinetic in the case of axial or angular displacement between the two shafts to be coupled, owing to the action of the complementary moment and the absence of means for positioning the floating device in such a case.

An object of the invention is to provide a coupling which perfectly satisfies this requirement and has in particular the following property: perfect homokinetic properties; complete universality permitting between the two shafts to be coupled angular, axial and radial relative displacements; absence of friction resulting in high efficiency and an absence of overheating; axial and radial compactness; dynamic balancing which may be achieved with precision and does not deteriorate with use; reliability and endurance; ease of assembly and disassembly which may be carried out in a restricted space with no need to displace the driving shaft and driven shaft; and relatively moderate cost having regard to the power transmitted and the effective life of the coupling.

According to the invention, there is provided a coupling of the aforementioned type wherein at least one of the ball joints of each lever is axially fixed.

To obtain this result in a simple manner, preferably each ball joint comprises a roller rotatively mounted on a journal which is oriented axially and cooperates with two radially oriented runways.

In a first embodiment, all the levers are mounted to undergo a pure rotation about a common axis. In this case, all the ball joints associated with one of the plates may be axially slidable or one branch of each lever may be articulated to the rest of the lever to pivot about an axis perpendicular to the centre axis, or the levers may have a certain flexibility in their axial plane.

In another embodiment in which all the ball joints are axially fixed, the centre articulation allows a relative axial movement of the levers and the inclination of at least one lever with respect to the others in a plane containing the centre axis.

Further features and advantages of the invention will be apparent from the ensuing description which is given merely by way of example with reference to the accompanying drawings in which.

The coupling 1 of FIGS. 1 to 5 couples two rotary shafts 2 and 3 which are liable to undergo relative angular, axial, and radial movements of variable extent. These shafts 2 and 3 are for example part of a transmission of a railway vehicle. The coupling comprises two plates 4 and 5 and a floating intermediate device 6.

Figure 1:
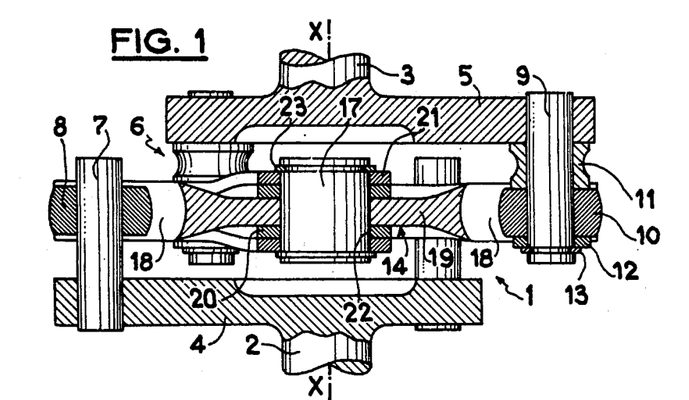
FIG. 1 is a longitudinal axial sectional view of a first embodiment of the coupling according to the invention.
Figure 2:
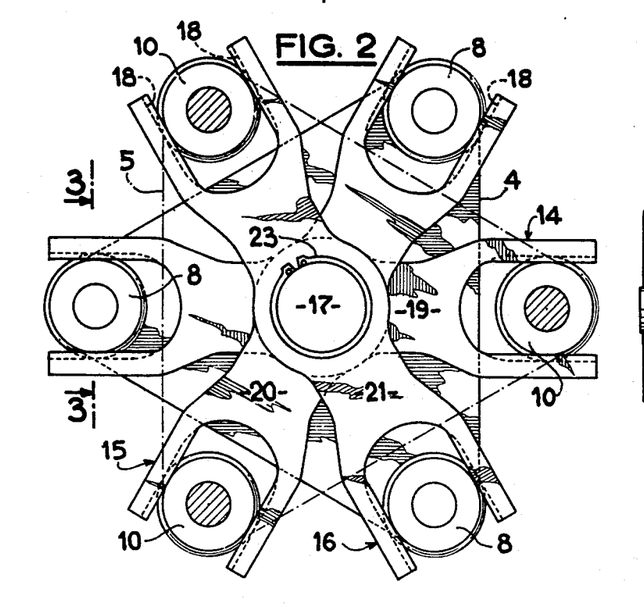
FIG. 2 is a first sectional view of this coupling.
Figure 3:
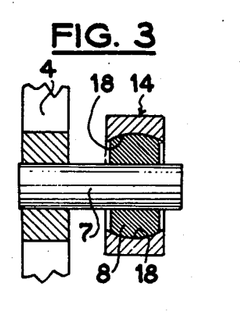
FIG. 3 is a partial sectional view taken on line 3—3 of FIG. 2.

At rest, the shafts 2 and 3 may be roughly coaxial or, on the contrary, possess an offset and/or angular deviation. For the purpose of the description of each embodiment and the drafting of the claims, it will be assumed that the two shafts are coaxial and have a common axis X—X, as shown in FIGS. 1 and 2.

The plates 4 and 5 are rigid with the confronting ends of the shafts 2 and 3 respectively. Each plate is contained in a radial plane with respect to its shaft and has the shape of an equilateral triangle. The two triangles are angularly offset 60° from each other about the axis X—X.

Fixed in each corner of the plate 4 is a journal 7 which is parallel to the axis X—X and extends toward the other plate. Each journal 7 carries a rotary roller 8 which is externally part-spherical. Likewise, fixed in each corner of the plate 5 is a journal 9 which extends toward the plate 4 and carries a rotary externally part-spherical roller 10. The three rollers 8 of the plate 4 are also slidably mounted on their journals and the rollers 10 of the plate 5 are prevented from axially moving by a spacer member 11 which is mounted on the journals 9 between these rollers and the plate 5 and by an assembly comprising a washer 12 and a circlip 13 mounted on the free end portion of the journals 9.

The intermediate device 6 comprises three levers 14 to 16 which are rotatively mounted on a shaft section 17 having an axis X—X. Each lever 14 to 16 is symmetrical with respect to the axis X—X and has two branches having fork-shaped end portions in each of which portions a pair of part-cylindrical runways 18 is provided. The four runways of the same lever have a common axis which intersects perpendicularly the axis X—X and a radius substantially equal to the outside radius of the rollers 8 and 10. The runways 18 are open at their outer end. In respect of each lever 14 to 16, a pair of runways receives a roller 8 and the other pair a roller 10.

Figure 4:
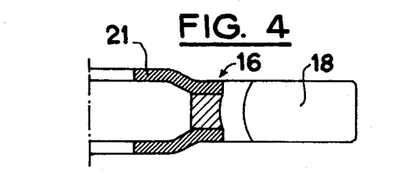
FIGS. 4 and 5 are partial longitudinal sectional views of two levers of the coupling of FIGS. 1 and 2.
Figure 5:
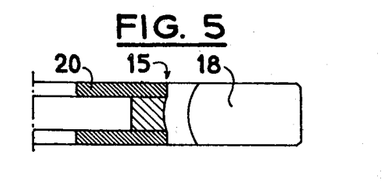

As seen in FIGS. 1, 4 and 5, the intermediate portion 19 of the lever 14 is solid whereas the portion 20, 21 of the levers 15 and 16 respectively is formed by two axially spaced webs so that the portions 19 to 21 can fit together and define a continuous cylindrical aperture 22 in which the shaft section 17 is mounted. The latter is axially retained by two circlips 23 which adjoin the two outer surfaces of the largest intermediate portion 21.

Thus the three levers 14 to 16 are freely rotatable but axially immobilised relative to each other and together constitute a spider structure having six branches (FIG. 2).

Figure 6:
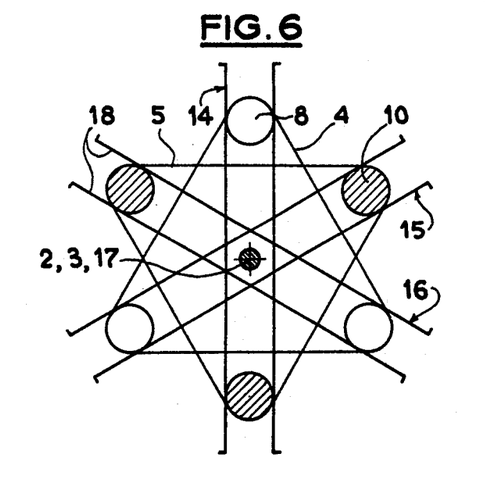
FIGS. 6 to 10 are diagrams illustrating the operation of this coupling.

FIG. 6 shows diagrammatically in elevation the state of the device when the shafts 2 and 3 are perfectly coaxial. The rollers 8 and 10 are all at the same distance from the axis common to the shafts 2 and 3 and to the shaft section 17 and are angularly spaced 60° apart from each other.

Figure 7:
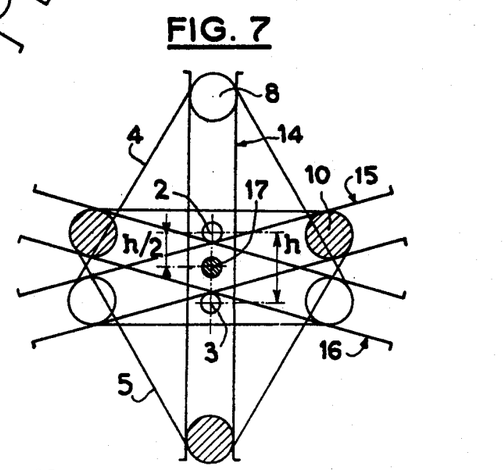

As shown in FIG. 7, if the shaft 3 is radially offset a distance h from the shaft 2 in a direction parallel to a lever, for example the lever 14, the shaft section 17 occupies a median position between the shafts 1 and 2, i.e. is offset in the same direction a distance d/2, and the angles that the levers 15 and 16 make between each other and with the lever 14 are modified. The same is true if the offset h is in a direction perpendicular to the lever 14 (FIG. 8), in which case the lever 14 also effects an angular movement and consequently irrespective of the direction of the relative radial offset of the shafts 2 and 3.

Consequently, the distances between the centre of the levers, i.e. the centre of the shaft section 17, and the two rollers of any one lever are always equal. The motion is therefore transmitted homokinetically when the shafts have a radial offset from each other. Further, as the levers constantly rotate about the shaft section 17 without an eccentric motion, the whole structure can be dynamically balanced as perfectly as desired.

Figure 9:
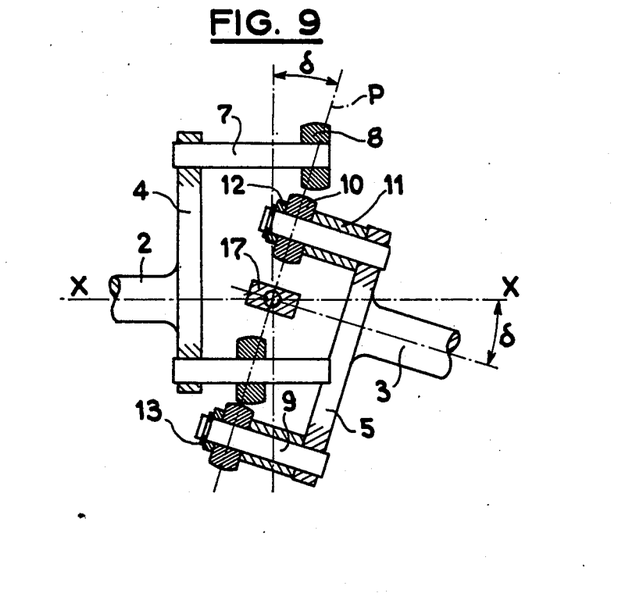
Figure 10:
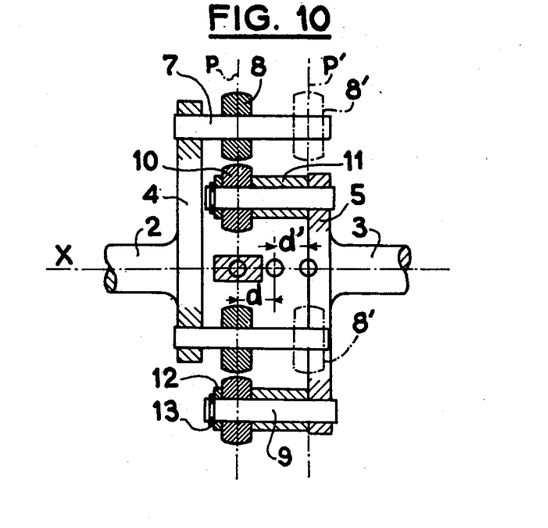

FIGS. 9 and 10 show diagrammatically the coupling 1 in elevation. When the shaft 3 deviates from the shaft 2 by an angle δ (FIG. 9), the plane of symmetry P of the three levers 14 to 16 is inclined at the same angle δ while remaining parallel to the plane of the plate 5 rigid with the shaft 3, since the rollers 10 cannot axially slide along their journals.

When the shaft 3 axially moves toward the shaft 2 in a movement of compression, or telescopically, to an extent d (FIG. 10), the plane of symmetry P of the levers 14 to 16 moves in the same way for the same reason as above. Inversely, a movement of elongation d' would bring the plane P to P' and the rollers 8 to position 8', as shown in dot-dash lines in FIG. 10.

Thus it will be understood that the freedom of the two shafts 2 and 3 to undergo angular deviation and a compression-elongation movement is due to the fact that the rollers 8 are slidable along their journals 7.

Figure 11:
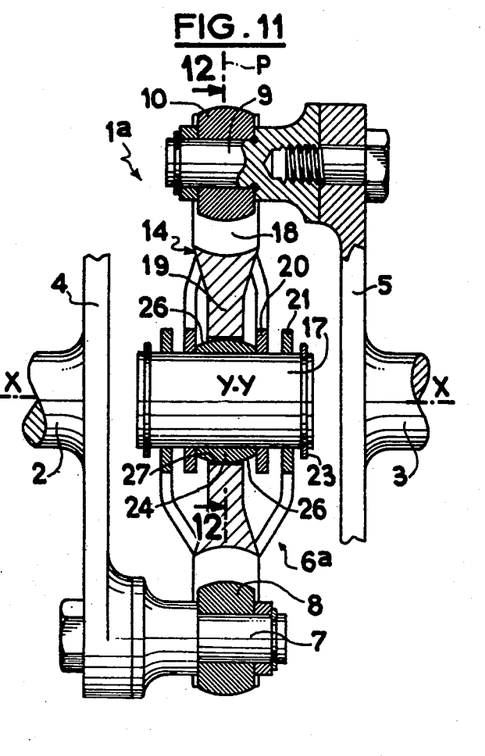
FIG. 11 is a view similar to FIG. 1 of a second embodiment of the coupling according to the invention.
Figure 12:
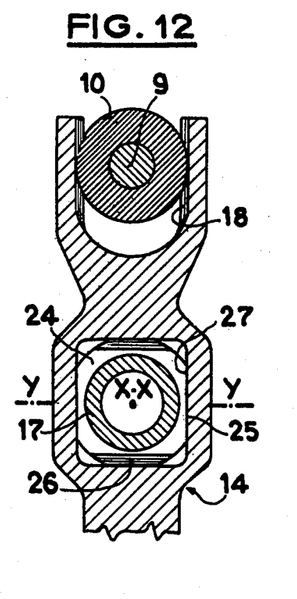
FIG. 12 is a partial sectional view taken on line 12—12 of FIG. 11.

In the embodiment 1a of FIGS. 11 and 12, the rollers 8 are, like the rollers 10, immobilised in translation on their journals and consequently cannot slide axially. On the other hand, the intermediate device 6a permits a relative axial movement of the three levers 14 to 16 and the inclination of the axis of at least one of these levers relative to the plane in which the other two levers are contained.

More precisely, slidably and rotatively mounted on the shaft section 17 is a ring 24 whose two opposed surfaces 25 are planar, parallel to the axis X—X and parallel to each other, the other two opposed surfaces 26, at 90° to the surfaces 25 about the axis X—X, being cylindrical and having the same radius and centered on an axis Y—Y which perpendicularly intersects the axis X—X.

The centre opening 27 of the lever 14 is rectangular with two sides in contact with the surfaces 25 and two sides in contact with two diametrally opposed points of the cylinder formed by the surfaces 26. The two webs of the intermediate portion 20 of the lever 15 are in contact with the end surfaces of the ring 24 and located at a distance e from each side of the intermediate portion 19 of the lever 14 and the two webs of the portion 21 of the lever 16 are spaced a distance e' from each side of this portion 20. Further, the circlips 23 of the shaft section 17 are spaced a distance e'' from each side of the portion 21. Thus each lever has a limited freedom to slide on the shaft section 17 in addition to its freedom to rotate, and the lever 14 can be inclined about the axis Y—Y with respect to the median plane P of the other two levers without however being free to move radially.

Figure 13:
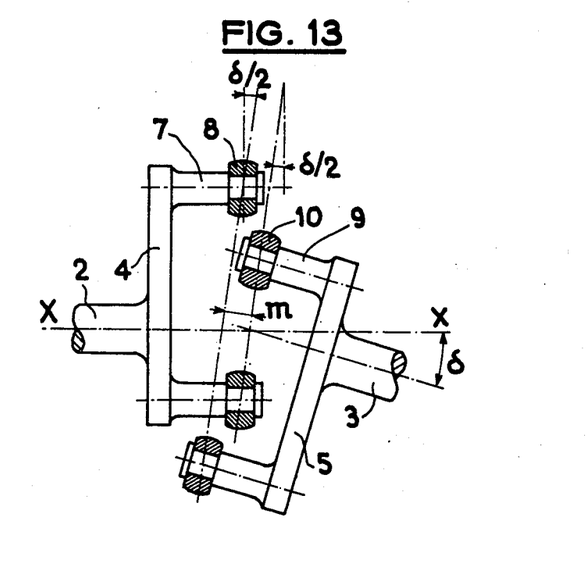
FIGS. 13 and 14 are diagrams illustrating the operation of the coupling of FIGS. 11 and 12.
Figure 14:
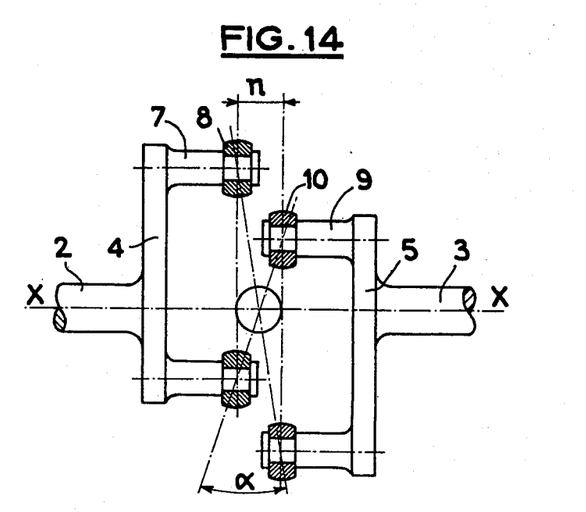

FIGS. 13 and 14 diagrammatically illustrate in elevation the behaviour of the coupling 1a.

Upon a relative angular deviation δ of the shafts 2 and 3 (FIG. 13), there is simultaneously produced an inclination δ/2 of the axes of the levers 14 to 16 and an axial offset m between these levers which, during the rotation of the shafts 2 and 3 at angle δ, varies in extent and sign in accordance with a sinusoidal law.

Upon a relative telescopic movement to the extent n of the shafts 2 and 3 (FIG. 14), the lever 14 is inclined at an angle α with respect to the plane of the levers 15 and 16.

Figure 8:
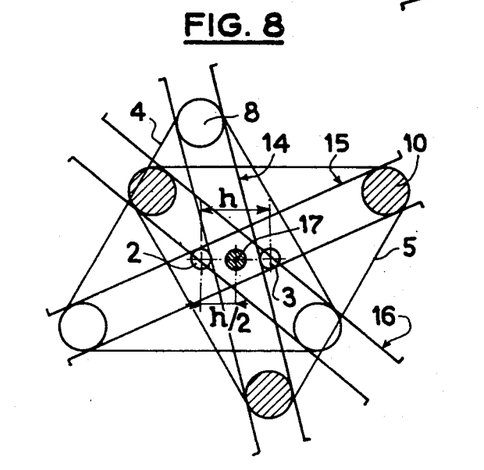

It will be understood that, in the case of a radial offset of the shafts 2 and 3, the coupling 1a behaves exactly in the same way as the coupling 1, i.e. as described hereinbefore with reference to FIGS. 6 to 8.

By way of a modification, the coupling 1a may be modified in such manner that the three levers 14 to 16 can be inclined with respect to each other by means of an appropriate ball joint assembly.

This embodiment shows moreover that it is possible to achieve a satisfactory construction of the coupling according to the invention with non-sliding rollers contained in two distinct parallel planes, for example spaced apart a distance n, the configuration of FIG. 14 then corresponding to the state of rest of the coupling when the two shafts are coaxial.

Figure 15:
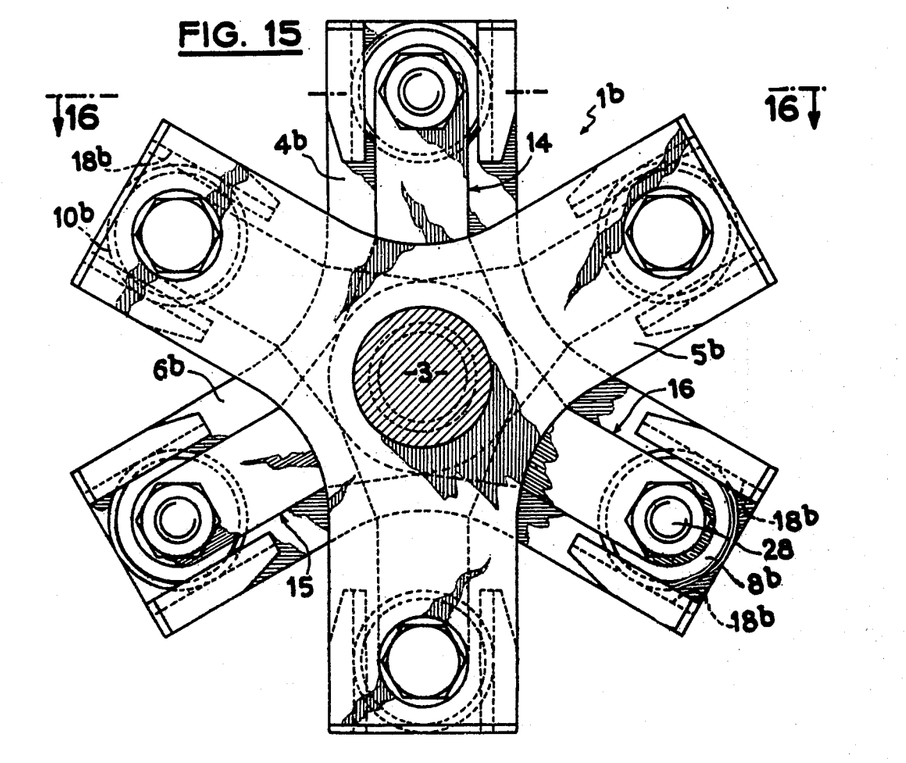
FIG. 15 is an elevational view of a third embodiment of the coupling according to the invention.
Figure 16:
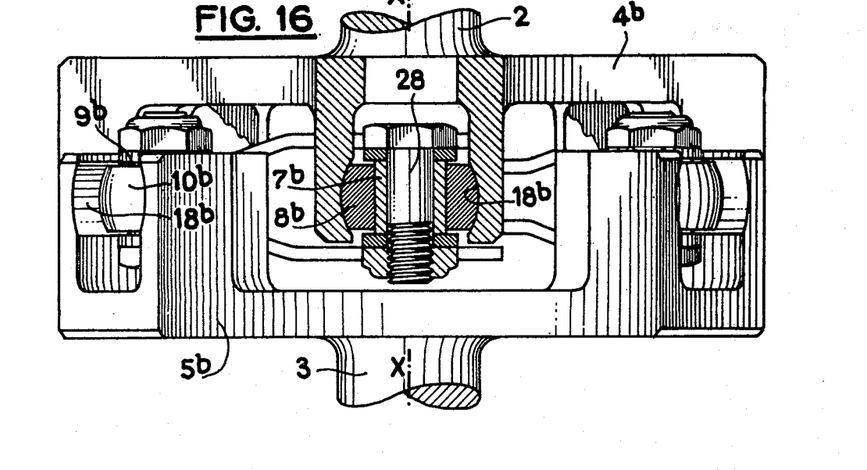
FIG. 16 is a sectional view taken on line 16—16 of FIG. 15.

FIGS. 15 and 16 show another embodiment 1b which is the opposite of the preceding embodiment in that the rollers are carried by the ends of the three pivotal levers and the runways cooperative with these rollers are formed in the plates 4b and 5b.

More precisely, each plate has the shape of a regular spider having three branches and a pair of runways 18b is provided at the end of each branch, each pair of runways defining a cylinder whose axis is perpendicular to and intersects the axis X—X. Further, each lever 14b to 16b is formed by two side walls or webs which are united at each end of each lever by a spacer sleeve 7b or 9b maintained by a bolt 28 which extends therethrough and bears on the outer surfaces of the lever. Rotatively but non-slidably mounted on this sleeve is a roller 8b or 10b which is trapped in a pair of runways 18b.

Each lever thus carries a roller 8b which cooperates with a pair of runways 18b of the plate 4b and a roller 10b which cooperates with a pair of runways 18b of the plate 5b. The three levers are mounted in the same way as in FIGS. 11 and 12 so as to form the floating intermediate device 6b. The coupling 1b behaves in a similar manner to the coupling 1a described hereinbefore with reference to FIGS. 13 and 14. This modification is applicable to all the other embodiments of the invention.

In each embodiment it is possible to eliminate friction from the coupling, for example by the use of needle bearings for the rotations and translations under load. Thus FIGS. 17 to 20 show a coupling 1c which is entirely mounted on needles so as to be capable of transmitting high power without overheating and of offering the minimum of opposition to the relative movements of the two shafts 2 and 3 coupled by the coupling.

Figures 17, 18:
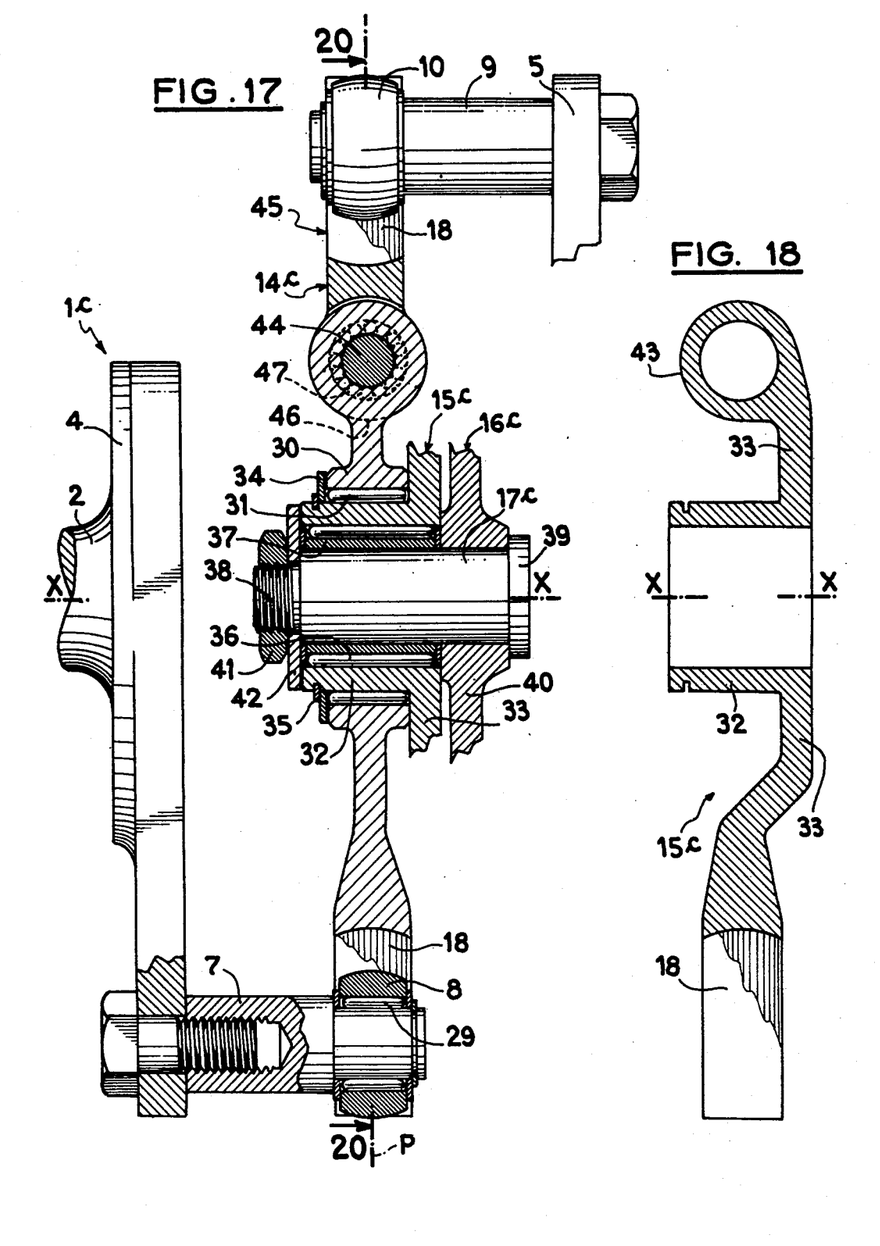
FIG. 17 is a longitudinal sectional view taken on line 17—17 of FIG. 20, with parts cut away, of a fourth embodiment of the coupling according to the invention.
FIGS. 18 and 19 are longitudinal sectional views of two levers of the coupling of FIG. 17.
Figure 19:
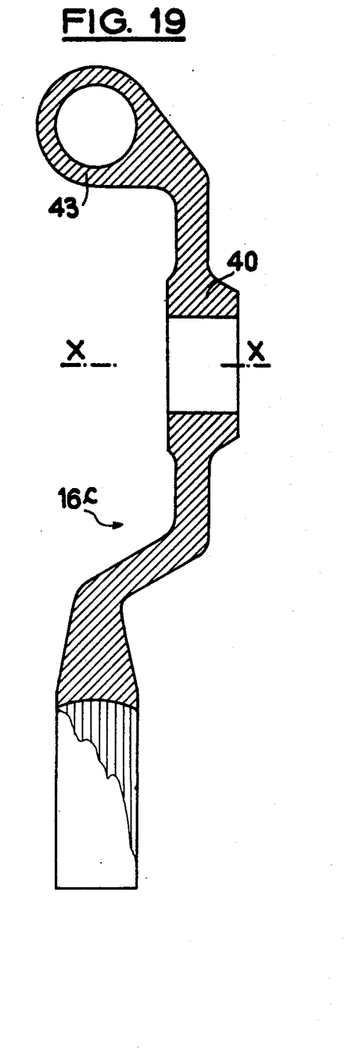
Figure 20:
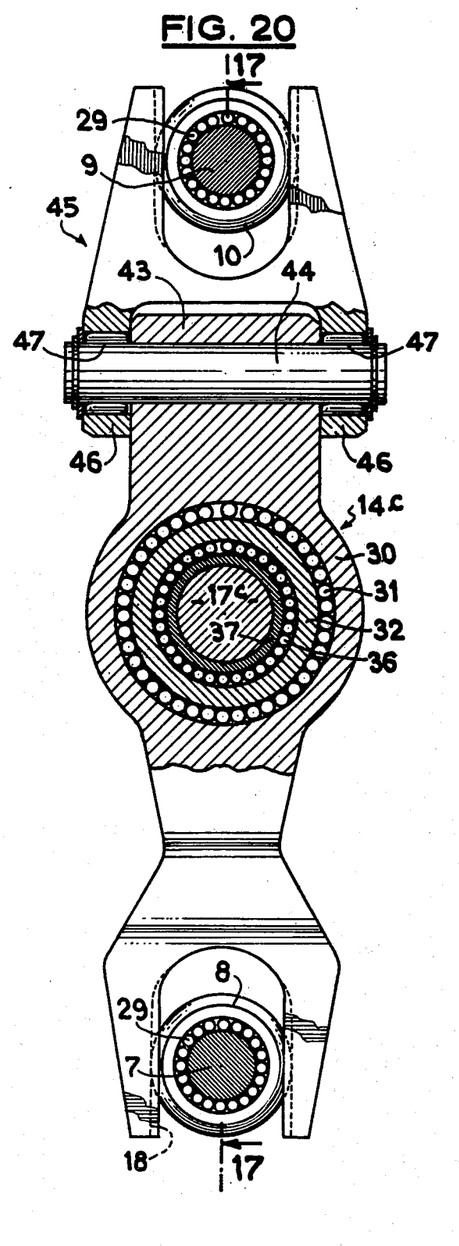
FIG. 20 is a partial sectional view taken on line 20—20 of FIG. 17.

The coupling 1c is of the same type as the coupling 1a of FIGS. 11 and 12 in that each plate 4, 5 carries three journals 7, 9, on which rollers 9, 10 are mounted to rotate but not to slide, a needle bearing 29 being however interposed between the bore of each roller and associated journalled.

Each lever 14c to 16c has a centre hub connected to a single web or side wall extending in two opposed directions. The hub 30 of the lever 14c is rotatively mounted by means of a needle bearing 31 on the hub 32 of the lever 15c and maintained axially against the side wall 33 of the latter by a washer 34 and a circlip 35, the latter being received in an annular groove formed on the free end portion of the hub 32.

The hub 32 is rotatively mounted by means of a needle bearing 36 on a sleeve 37 which is engaged on a shaft section 17c of greater length having at one end a screw-threaded portion 38 of smaller diameter and at the other end a head 39. The hub 40 of the lever 16c adjoins the hub 32 and is maintained axially between the latter and the head 39 by means of a nut 41 which is screwed on the end portion 38 and engages a retaining washer 42.

The side wall of each lever has at one end a pair of runways 18 receiving a roller 8, as before. On the other hand, on the opposite side of the corresponding hub, the side wall terminates at a short distance from this hub in a cylindrical bearing 43 whose axis is perpendicular to the axis X—X, this bearing having extending therethrough a pivot pin 44 which projects from each side. The pair of runways 18 located on this side of the hub, receiving the roller 10, is formed in an end portion of an attached member 45 which has at its other end two parallel lugs 46. Each lug 46 is provided with an aperture which receives one end portion of the pin 44, which end portion is rotatively mounted in this aperture by means of a needle bearing 47 which, by way of a modification, may be a rolling bearing having conical rollers or balls or other rolling members.

Owing to an axial offset of the side walls of the levers 15c and 16c (FIGS. 18 and 19), all the runways 18 and all the bearings 43 are in the same general plane P when the coupling 1c is in the neutral state. This coupling behaves substantially in the same way as the coupling 1 of FIGS. 1 to 6, with the sliding of the rollers 10 replaced by the very free angular movement of the members 45 about the pins 44. The distance q between the pin 44 and the axis X—X is preferably chosen to be as small as possible bearing in mind the requirements of strength, movement and assembly.

Owing to the needle bearings employed, the coupling 1c allows the shafts 2 and 3 to undergo their relative angular deviation and telescopic movements during the rotation when transmitting torque with a minimum mechanical loss.

Figure 21:
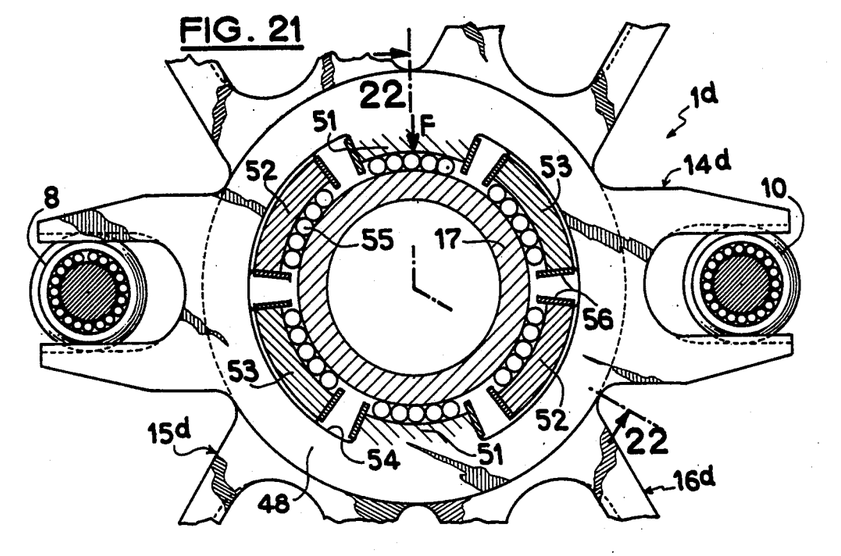
FIG. 21 is a partial cross-sectional view of a fifth embodiment of the coupling according to the invention.
Figure 22:
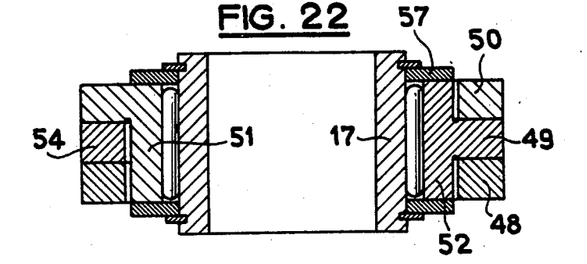
FIG. 22 is a sectional view taken on line 22—22 of FIG. 21.

The coupling 1d, shown partly in FIGS. 21 and 22, differs from the coupling 1 of FIGS. 1 to 5 only in that the rollers 8 and 10 are mounted on needle bearings and by the manner in which the levers are mounted on the shaft section 17 to undergo a pure rotation. Indeed, each lever 14d to 16d comprises a planar wall portion 48, 49, 50 and a partial hub consisting of two diametrally opposed cylindrical sectors 51, 52, 53 respectively. The three wall portions define a centre opening 54 of the same diameter and are assembled in adjoining relation to each other. Projecting into each centre opening 54 are two cylindrical sectors of a hub each of which subtends an angle at the centre of less than 60°. The mean line of two sectors of a lever is perpendicular to the main axis of this lever and corresponds to the direction F of the centre bearing of the lever on the shaft section 17.

The hub sectors 52 of the median lever 14d extend axially on each side of the wall portion 59 and the hub sectors 51 and 53 of the end levers 15d and 16d extend axially toward the lever 14d. All the sectors 51 to 53 have the same axial length and the pairs of sectors are angularly offset 60° from each other.

Each sector 51 to 53 is rotatively mounted on the shaft section 17 by means of a corresponding sector or series of needles 55 circumferentially retained by suitable lateral members which radially extend toward the axis X—X. The levers 14d to 16d are thus mounted on the shaft section 17 by means of an incomplete single ring arrangement of needles with, between the sectors 55 of this ring arrangement, a sufficient circumferential clearance to permit a relative angular movement of the three levers. Stop washers 57 retained by circlips axially maintain the assembly of the three levers on the shaft section 17. The coupling 1d behaves in the same way as the coupling 1 of FIGS. 1 to 5.

Figure 23:
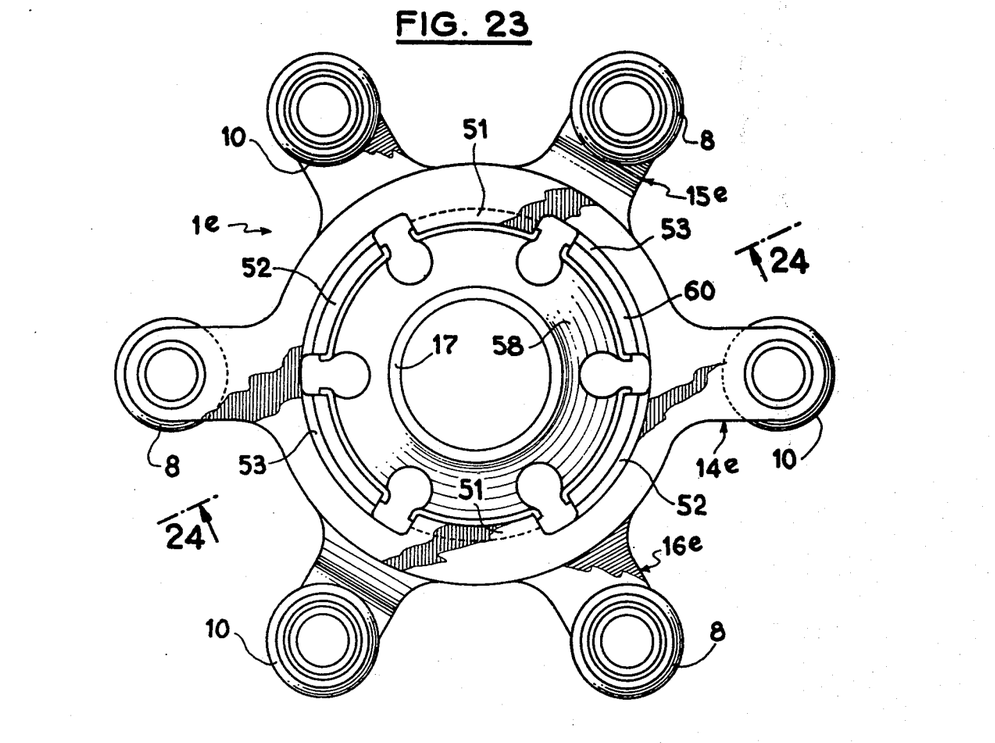
FIG. 23 is a partial elevational view of a modification of the coupling of FIGS. 21 and 22.
Figure 24:
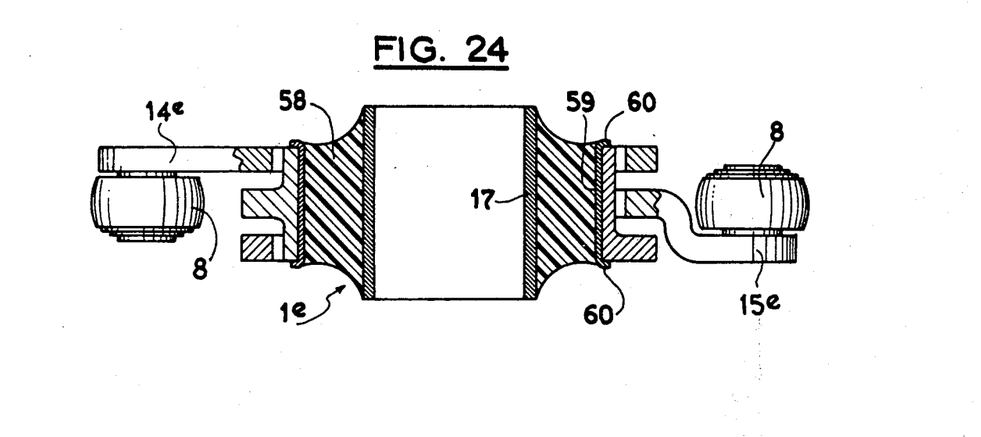
FIG. 24 is a sectional view taken on line 24—24 of FIG. 23.

The coupling 1e of FIGS. 23 and 24 is a modification of the preceding coupling in which the six sectors or series 55 of needles are replaced by six blocks of elastomer 58 which are circumferentially spaced apart so as to form an incomplete sleeve. These blocks adhere to the shaft section 17 owing to the fact that they are moulded thereon, and to sheet metal shoes 59 owing to the fact that they are moulded thereon. The shoes have end flanges 60 which fit on the hub sectors 51 to 53. In the illustrated embodiment, the six blocks 58 are interconnected by centre parts thereof.

The blocks 58 allow the levers 14e to 16e to undergo not only a circumferential relative movement but also a conical and axial relative movement. Consequently, the rollers 8 and 10 are mounted at the end of the levers without any possibility of axially sliding.

Figure 25:
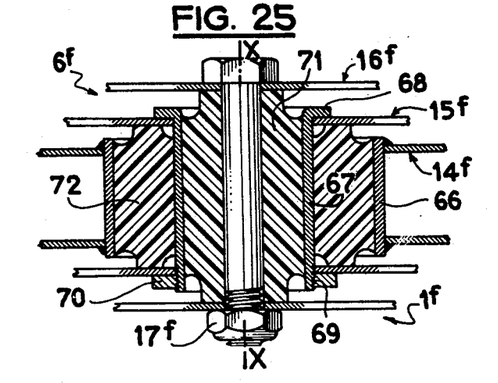
FIG. 25 is a partial longitudinal sectional view of a sixth embodiment of the coupling according to the invention.
Figure 26:
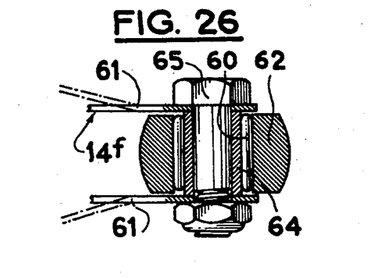
FIG. 26 is a sectional view of another detail of the coupling of FIG. 25.

FIGS. 25 and 26 show another modification 1f of the invention in which the centre articulation which assembles the three levers 14f to 16f comprises two sleeves of rubber or other elastomeric material disposed concentrically. Each lever comprises two side walls 61, for example of sheet steel, and carries at the ends thereof rollers 62 which are journalled by means of needles 60 on a tubular spacer member 64 which is held in position between the two side walls 61 by a bolt 65. A ring 66 is welded in the centre opening of the side walls of the narrowest lever 14f, these side walls being planar. Mounted in the centre opening of the side walls of the lever 15f, which are slightly divergent, is a ring 67 of smaller diameter having externally an end flange 68 and, at the opposite end, a screwthreaded portion 69 on which a nut 70 is screwthreadedly engaged. The side walls of the lever 16f, which are still more divergent are directly mounted on a bolt 17f which constitutes the centre shaft section of the floating device 6f.

A first elastomeric sleeve 71 surrounds the bolt 17f and is axially compressed by the latter between the side walls of the lever 16f. The outer surface of the sleeve 71 bears against the inner surface of the ring 67. A second elastomeric sleeve 72 likewise surrounds the ring 67 and externally bears against the inner surface of the ring 67 and is axially compressed between the side walls of the lever 15f by the tightening of the nut 70.

In this modification, the centre rubber sleeves 71 and 72 allow, in addition to a certain freedom of relative rotation between the three levers about the centre axis X—X, a slight possibility of a conical and axial articulation which may be sufficient for certain applications. It will be observed that the risk of destruction by violent centrifugation which exists in conventional couplings including blocks of rubber is avoided in this arrangement.

In all cases where a relative sliding is required between the rollers and their journals or between the levers in the floating intermediate device, as occurs in FIGS. 1 to 5, 11 and 12, 15 and 16, and 21 and 22, this axial sliding and the turning of the rollers and of the floating device may be arranged to be practically devoid of friction by the use of a journal device which is freely slidable and has needles parallel to and perpendicular to the axis X—X, such as described in French patent application No. 80 03355.

The efficiency of the coupling is then very close to 100% and there is no overheating of the mechanism or of the lubricant.

In each of the embodiments shown in the drawings, the floating device 6, 6a to 6f comprises three levers. In this way, the coupling operates isostatically and consequently there is an equal distribution of the loads between the six rollers notwithstanding constructional geometric irregularities. However, it is possible by way of a modification to construct couplings according to the invention which comprise four, five, six and more levers, although this presents two drawbacks: hypostaticity of the operational connections requiring high precision in the geometric construction of the active parts and complication of the coupling owing to an increased number of parts.

Further, in respect of applications requiring only a small angular deviation between the shafts to be coupled and only small axial displacements thereof, it is possible to envisage a simplified coupling in the following way. The levers are made from hardened steel sheet as shown in FIGS. 25 and 26, the side walls 61 being thin so as to possess maximum flexibility. The centre articulation is of the type shown in FIGS. 1 and 2 or 21 and 22, i.e. it has no axial clearance and no swivelling capability and the six rollers are axially retained on their pivots as in FIGS. 11 and 12. In this case, the flexibility of the levers is sufficient to permit relative movements between the two shafts.

It will be understood that it is possible to combine the arrangements shown in two described embodiments so as to constitute another arrangement. For example, each lever may carry a pair of runways at one end and a roller at the other end.

Having now described my invention what I claim as new and desire to secure by Letters Patent is:

1. A coupling between a first rotary shaft and a second rotary shaft, said coupling comprising a first plate coaxial with and rigid with said first shaft, a second plate coaxial with and rigid with said second shaft, said first and second shafts having a common axis under ideal conditions, means for providing for relative axial telescopic displacement of said shafts along said common axis, angular displacement of said shafts, and radial displacement of said shafts, said means for providing including a floating intermediate device comprising at least three levers and a center articulation pivotally assembling said levers, and further including means for connecting the opposite end portions of said levers to said plates, one end portion of each lever being connected to one plate, the other end portion being connected to the other plate, means for providing movement of said connecting means within said end portions in a radial direction relative to said common axis, said means for providing movement in a radial direction including rollers which roll in a radial direction engaged within the end portions of said levers, said end portions having track means extending in said radial direction for receiving said rollers, said connecting means including journals on which said rollers are mounted and which are connected to said plates, at least one of said rollers mounted on a journal being provided with means for preventing movement of said roller along the length of said journal, said journals extending parallel to said common axis under said ideal conditions when said first and second shafts are aligned.

2. A coupling according to claim 1, wherein all of said rollers are fixed on said journals preventing relative movement in a direction parallel to said common axis relative to the plates to which they are connected and all of said levers are assembled by said articulation so as to undergo a pure rotation about said common axis, each of said levers having flexibility in a plane of said each levers containing said common axis.

3. A coupling according to claim 1, wherein all of said levers are assembled by said articulation to undergo a pure rotation about said common axis and the rollers and journals associated with one of said plates are slidable relative to each other in a direction parallel to said common axis.

4. A coupling according to claim 1, wherein all of said rollers are fixed on said journals preventing relative movement in a direction parallel to said common axis relative to the plate to which they are connected, said levers are assembled by said articulation to undergo a pure rotation about said common axis, and each of said levers comprises a first lever part and a second lever part, and means for mounting said first lever part on said second lever part to be pivotable about an axis perpendicular to said common axis.

5. A coupling according to claim 3 or 4, wherein said articulation comprises sectors of a cylindrical hub defined by said levers, which sectors are imbricated with respect to each other with a circumferential clearance therebetween, a common shaft section assembling all of said sectors, a circumferentially retained series of needles being interposed between said shaft section and each of said sectors.

6. A coupling according to claim 1, wherein said articulation defines a centre pivot axis for said levers, all of said rollers are fixed on said jouranls preventing relative movement in a direction parallel to said common axis relative to the plate to which they are connected, and said articulation allows a relative movement of said levers along said common axis and allows an inclination of at least one of said levers with respect to the others of said levers in a plane containing said common axis.

7. A coupling according to any one of the claims 1, 3, 5 or 6 wherein said articulation comprises sectors of a cylindrical hub defined by said levers, which sectors are imbricated with respect to each other with a circumferential clearance therebetween, a common shaft section assembling all of said sectors.

* * * * *